United States Patent [19]

Bettermann et al.

[11] Patent Number: 5,496,482
[45] Date of Patent: Mar. 5, 1996

[54] PROCESS FOR THE PREPARATION OF ALKALI METAL ACETATES

[75] Inventors: Gerhard Bettermann, Nörvenich; Günther Schimmel, Erftstadt; Johannes Himmrich, Hürth-Kendenich, all of Germany

[73] Assignee: Hoechst Aktiengesellschaft, Frankfurt am Main, Germany

[21] Appl. No.: 984,330

[22] Filed: Dec. 2, 1992

[30] Foreign Application Priority Data

Dec. 14, 1991 [DE] Germany ............... 41 41 300.8

[51] Int. Cl.$^6$ .................................... C09K 3/18
[52] U.S. Cl. ............... 252/70; 252/76; 252/79; 106/13
[58] Field of Search ............ 252/70, 73; 423/173; 562/607; 106/13

[56] References Cited

U.S. PATENT DOCUMENTS

| | | | |
|---|---|---|---|
| 4,377,488 | 3/1983 | Gancy | 252/70 |
| 4,855,071 | 8/1989 | Todd, Jr. et al. | 252/70 |
| 5,132,035 | 7/1992 | Hoenke et al. | 252/70 |
| 5,238,592 | 8/1993 | Stankowiak et al. | 232/70 |

FOREIGN PATENT DOCUMENTS

| | | |
|---|---|---|
| 375214 | 6/1990 | European Pat. Off. |
| 483721 | 5/1992 | European Pat. Off. |
| 494506 | 7/1992 | European Pat. Off. |
| 505746 | 9/1926 | Germany. |
| 4034217 | 5/1991 | Germany. |

*Primary Examiner*—Paul Lieberman
*Assistant Examiner*—Necholus Ogden
*Attorney, Agent, or Firm*—Connolly & Hutz

[57] ABSTRACT

To prepare a corrosion-inhibiting liquid de-icing agent based on alkali metal acetates, 30 to 50 percent strength by weight alkali metal hydroxide solution is introduced into a reaction container provided with a cooling device and a mixing device, and 85 to 100% strength acetic acid is metered into the reaction container until the ratio by weight of acetic acid to alkali metal hydroxide solution therein (0.30 to 0.45):1. A portion of this solution is transferred from the reaction container to a stirred dissolving tank and 0.03 to 1% by weight, relative to the batch, of benzotriazole and/or tolyltriazole and/or imidazole is dissolved therein. The resulting solution containing azole is introduced into the reaction container along with 0.01 to 0.2% by weight of phosphoric acid, relative to the batch. Acetic acid continues to be metered into the reaction container until the density of the solution in the reaction container is 1.07 to 1.39 g/cm$^3$ at 20° C. Small amounts of alkali metal hydroxide solution or acetic acid are then introduced into the reaction container until the pH of the solution therein is 9.2 to 9.8. Finally, this solution is withdrawn from the reaction container as a liquid de-icing agent.

7 Claims, No Drawings

PROCESS FOR THE PREPARATION OF ALKALI METAL ACETATES

The present invention relates to a process for the preparation of a corrosion-inhibiting liquid de-icing agent based on alkali metal acetates as well as benzotriazole and/or tolyltriazole and/or imidazole and phosphoric acid as inhibitors.

U.S. Pat. No. 4 855 071 discloses a process for the preparation of a de-icing agent in which a slurry is first prepared from alkaline earth or alkali metal bases or their mixtures and water. A carboxylic acid with 1 to 4 carbon atoms in an amount which is sufficient for complete neutralization of the bases, and enough water to render the resulting carboxylate slurry liquid and pumpable are introduced into the slurry. The carboxylate slurry, heated to temperatures of about 40 to 120° C. is distributed in a thin layer onto substrate particles and the coated substrate particles are then dried.

The liquid de-icing agent according to the unpublished German Patent Application P 40 34 792.3 comprises 15 to 70% by weight of alkali metal acetate or alkaline earth acetate or mixtures thereof, 0.01 to 1% by weight of a triazole compound or imidazole compound or mixtures thereof and water, its preparation taking place by mixing together the separate components.

The disadvantage of the preparation disclosed in the German patent application is that solid benzotriazole, tolyltriazole and imidazole possess a low solubility in alkali metal acetate solution and a low rate of dissolution.

The task of the present invention is therefore to present a process for the batch-wise preparation of a liquid deicing agent based on alkali metal acetates and inhibitors, the inhibitors being homogeneously distributed in the de-icing agent. This is achieved according to the invention by introducing 30 to 50 percent strength by weight alkali metal hydroxide solution into a reaction container provided with a cooling device and a mixing device; metering 85 to 100% strength acetic acid into the reaction container until the ratio by weight of acetic acid to alkali metal hydroxide solution in it is (0.20 to 0.45) : 1, preferably (0.30 to 0.40) : 1; transferring a portion of this solution from the reaction container into a stirred dissolving tank and dissolving therein 0.03 to 1% by weight, relative to the batch, of benzotriazole and/or tolyltriazole and/or imidazole; introducing the solution containing azole and 0.01 to 0.2% by weight, relative to the batch, of phosphoric acid into the reaction container; continuing to meter acetic acid into the reaction container until the density of the solution in the reaction container is 1.07 to 1.39 g/cm$^3$ at 20° C.; introducing small amounts of alkali metal hydroxide solution or acetic acid into the reaction container until the pH of the solution therein is 9.2 to 9.8 and finally withdrawing this solution from the reaction container as a liquid de-icing agent.

The process according to the invention may furthermore, if desired, have the features that a) the solution which is withdrawn from the reaction container with a pH of 9.2 to 9.8 is filtered;

b) the filtration is performed under pressure;

c) the filtered solution is feed to a storage tank;

d) the alkali metal hydroxide solution has an alkali content of 40 to 45% by weight e) the phosphoric acid contains 80 to 85% by weight of $H_3PO_4$.

In the process according to the invention, the homogeneous distribution of benzotriazole, tolyltriazole and/or imidazole is achieved by initially introducing these substances into partially neutralized alkali metal hydroxide solution, in which they dissolve particularly well, then introducing the clear solution into the reaction container before the contents of the reaction container are fully neutralized.

If chemically pure potassium hydroxide solution and technical grade acetic acid are used in the process according to the invention, then the solution produced in the reaction container with a pH of between 9.2 and 9.8 is water-clear. If, however, only technical grade potassium hydroxide solution is used instead of chemically pure potassium hydroxide solution, then iron compounds are precipitated, resulting in a turbid solution which has to be filtered. Since the iron compounds form a slimy precipitate, filtration is advantageously performed under pressure.

EXAMPLE 1

30 t of chemically pure potassium hydroxide solution (45% by weight KOH) were introduced into a reaction container (60 m$^3$) and circulated by pumping through a tubular heat exchanger (exchange area: 20 m$^3$). 400 kg/h of technical grade acetic acid (99.9% $CH_3COOH$) were metered into the pumped circuit on the suction side of the pump for 29 hours. The ratio by weight of acetic acid to potassium hydroxide solution was then 0.39:1.

47.3 kg of tolyltriazole were dissolved in 0.5 m$^3$ of this solution in a stirred container and the clear solution which contained tolyltriazole was introduced into the pumped circuit on the suction side of the pump. Subsequently 23.6 kg of phosphoric acid (85% by weight) and 2.8 t of water were introduced in the same way. Finally the metering of 400 kg/h of acetic acid into the pumped circuit was continued for about 7 hours, the density of the solution in the reaction container then being 1.275 g/cm$^3$ (at 20° C.). After the introduction of a further 2.8 t of acetic acid, a water-clear solution with a pH of 9.5 and with a tolyltriazole concentration of 0.1% by weight and a phosphoric acid concentration of 0.05% by weight, each being relative to the batch, was present in the reaction container.

EXAMPLE 2

Example 1 was repeated with the modification that 61 kg of benzotriazole were introduced into the partially neutralized potassium hydroxide solution instead of tolyltriazole.

The resulting water-clear solution with a pH of 9.5 contained 0.15% by weight of benzotriazole and 0.05% by weight of phosphoric acid, in each case relative to the batch.

EXAMPLE 3

Example 1 was repeated with the modification that 95.5 kg of imidazole were introduced into the partially neutralized potassium hydroxide solution instead of tolyltriazole.

The resulting water-clear solution with a pH of 9.5 contained 0.2% by weight of imidazole and 0.05% by weight of phosphoric acid, in each case relative to the batch.

We claim:

1. A process for the preparation of a corrosion-inhibiting liquid de-icing agent based on alkali metal acetates as well as phosphoric acid and an inhibitor selected from the group consisting of benzotriazole, tolyltriazole and imidazole, which comprises initially introducing a 30 to 50 percent by weight strength alkali metal hydroxide solution into a reaction container provided with a cooling device and a mixing device; metering 85 to 100% strength acetic acid into the reaction container until the ratio by weight of acetic acid to alkali metal hydroxide solution therein is (0.20 to 0.45):1; transferring a portion of this solution from the reaction container into a stirred dissolving tank and dissolving therein 0.03 to 1% by weight, relative to the batch of an inhibitor selected from the group consisting of benzotriazole, tolytriazole and imidazole; introducing the solution containing azole and 0.01 to 0.2% by weight, relative to the batch, of phosphoric acid into the reaction container; continuing to meter acetic acid into the reaction container until the density of the solution in the reaction container is 1.07 to 1.39 g/cm$^3$ at 20° C.; introducing small amounts of alkali metal hydroxide solution or acetic acid into the reaction container until the pH of the solution therein is 9.2 to 9.8 and finally withdrawing this solution from the reaction container as a liquid de-icing agent.

2. The process as claimed in claim 1, wherein the solution with a pH of 9.2 to 9.8 which is withdrawn from the reaction container is filtered.

3. The process as claimed in claim 2, wherein filtration is performed under pressure.

4. The process as claimed in claim 2, wherein the filtered solution is fed to a storage tank.

5. The process as claimed in claim 1, wherein the alkali metal hydroxide solution has an alkali content of 40 to 45% by weight.

6. The process as claimed in claim 1, wherein the phosphoric acid contains 80 to 85% by weight of $H_3PO_4$.

7. The process as claimed in claim 1, wherein the ratio by weight of acetic acid to alkali metal hydroxide is (0.30 to 0.40):1.

* * * * *